United States Patent
Bihel et al.

(10) Patent No.: US 9,115,733 B2
(45) Date of Patent: Aug. 25, 2015

(54) HYDRAULIC ACTUATOR WITH A LIMIT FORCE DETECTOR DEVICE

(75) Inventors: Jean-Romain Bihel, Le Rove (FR); Pascal Leguay, Alleins (FR); Cédric Carlavan, Saint Alban de Roche (FR); Nicolas Bourdais, L'Gtang la Ville (FR)

(73) Assignee: Airbus Helicopters, Marignane Cedex (FR)

( * ) Notice: Subject to any disclaimer, the term of this patent is extended or adjusted under 35 U.S.C. 154(b) by 716 days.

(21) Appl. No.: 13/178,040

(22) Filed: Jul. 7, 2011

(65) Prior Publication Data
US 2012/0011840 A1 Jan. 19, 2012

(30) Foreign Application Priority Data
Jul. 19, 2010 (FR) ..................................... 10 03021

(51) Int. Cl.
F15B 9/02 (2006.01)
F15B 15/20 (2006.01)
F15B 20/00 (2006.01)
G01L 1/02 (2006.01)

(52) U.S. Cl.
CPC ............... *F15B 15/20* (2013.01); *F15B 20/007* (2013.01); *G01L 1/02* (2013.01)

(58) Field of Classification Search
CPC ......... F15B 20/007; F15B 15/20; G01L 1/02; G01L 1/12
USPC ................................ 92/5 R, 5 L, 60, 163, 23
See application file for complete search history.

(56) References Cited

U.S. PATENT DOCUMENTS

| | | | | |
|---|---|---|---|---|
| 3,934,238 A | * | 1/1976 | Pavlou | 340/611 |
| 4,793,188 A | * | 12/1988 | Strasser et al. | 73/745 |
| 5,327,724 A | * | 7/1994 | Tribuzio et al. | 60/568 |
| 6,685,138 B1 | * | 2/2004 | Krantz | 244/99.5 |
| 2001/0036397 A1 | * | 11/2001 | Pierrou et al. | 414/540 |
| 2003/0121409 A1 | | 7/2003 | Lunzman et al. | 91/459 |
| 2005/0092094 A1 | * | 5/2005 | Kussel | 73/730 |
| 2005/0273288 A1 | | 12/2005 | Yamamoto et al. | 702/100 |
| 2006/0021348 A1 | * | 2/2006 | Neumann et al. | 60/716 |
| 2007/0194738 A1 | * | 8/2007 | Hirai | 318/480 |

FOREIGN PATENT DOCUMENTS

FR 2059805 6/1971
WO WO 0114841 A1 * 3/2001 ............... G01L 9/10

OTHER PUBLICATIONS

Search Report and Written Opinion; Application No. FR 1003021; dated Feb. 24, 2011.

* cited by examiner

*Primary Examiner* — Dwayne J White
*Assistant Examiner* — Matthew Wiblin
(74) *Attorney, Agent, or Firm* — Brooks Kushman P.C.

(57) ABSTRACT

The present invention relates to a servo-control (1) provided with at least one body (2) defining an inside space (10) together with a slider element (11) having a control piston (12) suitable for sliding in said inside space (10), said control piston (12) subdividing said inside space (10) into a retraction chamber (4) and an extension chamber (3). The servo-control (1) has at least one limit force detector device (20) comprising a casing (21) secured to said body (2) and defining a detection space (22). Furthermore, a movable member (50) subdivides said detection space (22) into a first detection chamber (26) opening out to said inside space (10) and a second detection chamber (27). Finally, the device includes detector means (29) for detecting the position of said movable member (50) in said detection space (22).

16 Claims, 5 Drawing Sheets

HYDRAULIC ACTUATOR WITH A LIMIT FORCE DETECTOR DEVICE

CROSS REFERENCE TO RELATED APPLICATIONS

This application claims the benefit of FR 10 03021 filed on Jul. 19, 2010, the disclosure of which is incorporated in its entirety by reference herein.

BACKGROUND OF THE INVENTION (1) Field of the Invention

The present invention relates to an aircraft servo-control provided with a limit force detector device, said aircraft being constituted by a rotorcraft and in particular by a helicopter.

(2) Description of Related Art

Conventionally, an aircraft includes control members that are capable of being controlled by the pilot, such as the blades of a helicopter lift rotor, or even airplane rudders, for example.

Using flight controls, the pilot causes control members of the aircraft to move. Nevertheless, the forces that need to be delivered in order to move the control members are sometimes very great.

Consequently, the linkage connecting a flight control to a control member is often fitted with a servo-control enabling the pilot to control the aircraft accurately and without difficulty.

More particularly, a helicopter is provided with a main rotor providing it with lift and propulsion. In order to control the helicopter, a pilot changes the pitch of the blades of the main rotor, i.e. their angle of incidence relative to the incident stream of air.

As a result, the rotorcraft includes a cyclic swashplate having a stationary bottom plate and a rotary upper plate. The stationary lower plate is connected to the pilot's flight controls, generally via three distinct control lines, while the rotary upper plate is connected to each of the blades via a respective rod. The cyclic swashplate is thus a control device that slides vertically along the mast of the main rotor to control the general pitch of the blades of the main rotor while also being capable of oscillating in any direction about a ball joint so as to control the cyclic pitch of the blades.

The oscillations and the vertical movements of the cyclic swashplate as controlled by the pilot thus cause the pitch of the blades to vary and they enable the pilot to control the helicopter.

Conventionally, the pilot controls the cyclic swashplate via mechanical controls that are connected to said cyclic swashplate by rods. Nevertheless, the forces that the pilot needs to exert in order to move the cyclic swashplate are very large, in particular if the weight of the rotorcraft is relatively great.

Consequently, a servo-control is arranged between an upstream portion and a downstream portion of each control linkage. The pilot then acts on the servo-controls via the upstream portion of the linkage and without exerting large amounts of force, and then the servo-controls reproduce the pilot's orders by delivering greater amounts of force to the downstream portion of the linkage.

Similarly, a helicopter is provided with a tail rotor and the pitch of its blades can be modified via a servo-control.

Naturally, the same applies for example to the ailerons of airplanes that are operated via servo-controls.

It should be observed that some modern aircraft include electric flight controls that replace the mechanical connections that are used to connect the flight controls to the servo-controls.

In conventional manner, the servo-controls include at least an outer body of cylindrical shape having a slider element movable in translation therein and provided with a rod carrying a control piston, the control piston defining a retraction chamber and an extension chamber inside the outer body.

The servo-control may also include a hydraulic directional control valve or it may co-operate with such a hydraulic control valve. Movement of the control piston on the slider element relative to the outer body is then controlled by the hydraulic control valve, which is itself actuated by the flight controls of the helicopter pilot via the upstream portion of a linkage. Depending on the orders received, the hydraulic control valve feeds hydraulic fluid to the retraction chamber or to the extension chamber in order to cause the servo-control to retract or to extend.

It will be understood that in the text below the term "retraction chamber" is used to designate a chamber causing the servo-control to retract when said chamber is filled with a fluid. Conversely, the term "extension chamber" is used to designate a chamber that causes the servo-control to extend when said chamber is filled with a fluid.

Two embodiments of servo-controls then coexist.

In a first embodiment, the control piston is secured to a stationary point of the aircraft, with the body moving as a function of the orders received and being connected to the downstream portion of the linkage. The person skilled in the art may refer to this type of servo-control as a "moving body servo-control".

In contrast, in a second embodiment, the body is secured to a stationary point of the aircraft, with the control piston moving as a function of the orders received and being connected to the downstream portion of the linkage. The person skilled in the art may refer to this type of servo-control as a "stationary body servo-control".

Furthermore, whatever the embodiment, there are servo-controls that the person skilled in the art may refer to as "single-body" or as "two-body" servo-controls.

A single-body servo-control then has a single body defining one retraction chamber and one extension chamber that are separated by a control piston. The retraction chamber and the extension chamber are then fed from a single hydraulic control valve.

Such a servo-control performs its function well. Nevertheless, for reasons of safety, particularly as from a certain level of force that needs to be developed, the person skilled in the art tends to make use of a two-body servo-control.

A two-body servo-control then has a lower body and an upper body that are assembled in tandem or in parallel.

For example, a servo-control having two bodies in tandem has a slider element with one rod and two pistons, each piston subdividing a corresponding body into a retraction chamber and an extension chamber.

Furthermore, two distinct hydraulic control valves, actuated by a common inlet lever connected to the pilot's flight controls are used for feeding the retraction and extension chambers respectively of the lower and upper bodies.

There also exist servo-controls that are provided with three bodies or even more.

During flight at high speed, extreme maneuvers of the aircraft may give rise to high levels of mechanical stress in the structure of the aircraft. Beyond given load factors, there is the risk of damaging the structure.

In order to warn the pilot that the aircraft is approaching a maneuvering limit, it is possible to provide a device for detecting a limit force on a servo-control. When the force exerted on the servo-control reaches a limit threshold, i.e. a traction force limit or a compression force limit, the limit force detector device triggers a warning, e.g. a visible warning, in order to inform the pilot.

Conventionally, the limit force detector device comprises a detector element provided with a rod fitted with a detection piston that slides in a detection space, the detection space having two detection chambers that are separated by the detection piston, these chambers being independent from the retraction and extension chambers of the outer body. The first detection chamber is fed with fluid by the hydraulic circuit of the aircraft, and the second detection chamber opens out to the outside of the servo-control.

Furthermore, the rod of the detector element projects from the body of the servo-control so as to be connected to the downstream portion of the linkage. This projecting portion of the detector element further includes a lever suitable for co-operating with a pushbutton switch.

Below the limit threshold, the pressure that exists in the detection chamber keeps the detection piston in high abutment so as to ensure that its lever is remote from the switch. In contrast, when the threshold is reached, the pressure that exists in the detection chamber can no longer keep the detection piston in high abutment. The detection piston then reaches a low abutment, with the lever then actuating the switch.

In order to damp the travel of the detection piston in the event of the external force varying at high frequency or in the event of the servo-control being operated quickly, the limit force detection device may include headloss-generator means, e.g. of the diaphragm type, upstream from the first detection chamber.

In order to avoid fluid passing from the detection chamber to the outside of the servo-control, the detection piston carries a gasket. Since this gasket is stressed dynamically, leaks to the outside of the servo-control may nevertheless appear and require maintenance action.

Furthermore, the limit force detector device is subjected to the forces to which the servo-control is subjected by being connected to the control linkage. Under such circumstances, it needs to be dimensioned so as to be capable of withstanding said forces. This gives rise to financial costs and weight that are not negligible.

Finally, the sliding of the detection piston has the practical consequence of giving rise to slack in the control linkage in the event of a drop of pressure in the hydraulic circuit feeding fluid to the limit force detector device.

SUMMARY OF THE INVENTION

An object of the present invention is thus to propose an alternative servo-control, serving in particular to overcome the above-mentioned limitations.

According to the invention, a servo-control is provided with at least one body defining an inside space and a slider element having a control piston suitable for sliding in the inside space, the control piston subdividing the inside space into a retraction chamber and an extension chamber suitable for being fed with a fluid delivered by a source, a liquid delivered by a hydraulic circuit via a hydraulic directional control valve, for example, the servo-control having at least one limit force detector device for detecting a limit force.

The servo-control is remarkable in that the limit force detector device comprises:

a casing secured to the body and defining a detection space;
a movable member slidable in the detection space, the movable member subdividing the detection space into a first detection chamber opening out to the inside space and a second detection chamber that is maintained at a given pressure by being fed with fluid via the above-mentioned source or by opening out into a chamber of the inside space that is distinct from the chamber in communication with the first detection chamber, for example; and
detector means for detecting the position of the movable member in the detection space in order to determine whether the movable member has reached a predetermined limit position corresponding to the presence of a limit force being exerted on the servo-control.

It should be observed that the static force exerted on the servo-control in compression or in traction varies linearly with the pressure of the fluid contained in the chamber of the inside space that is in communication with the first detection chamber.

When the force exerted on the servo-control increases, the pressure increases in the first detection chamber. Above a certain force threshold exerted on the servo-control, the movable member is caused to move in the detection space. The detector device of the invention then detects that the servo-control is being subjected to a force that is greater than or equal to a predetermined limit force when the movable member reaches a predetermined limit position that is detected by the detector means.

The movable member does not project out from the servo-control. Thus, the detector device does not involve a dynamic gasket that might give rise to leakage to the outside of the servo-control.

In addition, the movable member is not connected to the control linkage. Under such circumstances, the detector device can be dimensioned in relatively simple manner.

The servo-control may also include one or more of the following additional characteristics.

In an aspect of the invention, the detector device is removable.

For example, the body is provided with an orifice opening out into the inside space of said body, the orifice being closed by dedicated means when the detector device is absent. Furthermore, this body may include a thread suitable for co-operating with a thread of the casing.

In order to fit the body with the detector means, the dedicated means are removed and the casing is secured to the body by using said threads, for example.

A gasket may be arranged between the casing and the body. Since the gasket is not stressed dynamically, risks of leakage are negligible.

In a variant, the detector means may on the contrary be permanently secured. For example, the casing and the body may form a single piece.

According to another aspect of the invention, the body includes fastener means distinct from the detector device and suitable for fastening the servo-control to an external fastener element, i.e. an external fastener element for fastening to a linkage or to a stationary point. The movable member is therefore not subjected to the forces exerted on the servo-control.

Furthermore, the servo-control may for example have a connection suitable for connecting the second detection chamber to pressurization means at a given pressure, such as the source feeding fluid to the inside space, i.e. the hydraulic circuit of an aircraft, for example, with the connection optionally including first headloss-generator means, e.g. of the diaphragm type.

In another variant, the second detection chamber is connected to the chamber of the inside space that is not in communication with the first detection chamber.

Furthermore, second headloss-generator means may be arranged between the first detection chamber and the inside space.

A high frequency variation of the external force exerted on the servo-control or a fast movement of the servo-control giving rise to a high transient pressure in the inside space then has no effect on the movement of the movable member.

Furthermore, the detector means may be arranged on the casing. This characteristic serves to limit any risk of hydraulic leakage when the fluid is an oil type liquid, for example.

For example, the detector means comprise a reed switch and a magnet placed on the movable member.

More precisely, a reed switch is an electric switch that is controlled by a magnetic field. It has a main blade and two secondary blades that are arranged in a bulb. The main blade is normally in contact with a first secondary blade but is deflected by a magnetic field so as to come into contact with the second secondary blade.

In moving, the magnet of the movable member can thus cause the reed switch to change from one position to another.

In order to encourage detecting the position of the movable member, the detection space is dimensioned so that the stroke of the movable member is sufficient to allow the limit force to be detected. Optionally, provision may be made for means for amplifying the movement of the movable member.

In order to inform an operator about the presence of a limit force being exerted on the servo-control, the detector device optionally includes warning means controlled by the detector means, e.g. visible warning means. The warning means trigger a warning when the movable member is situated in a limit position corresponding to the servo-control being stressed with a predetermined limit force.

Furthermore, depending on the embodiment, the servo-control may include as alternatives:

either a single detector device having a first detection chamber opening out to the retraction chamber of the servo-control;

or a single detector device having a first detection chamber opening out to the extension chamber of the servo-control;

or else a detector device having a first detection chamber opening out to the retraction chamber of the servo-control, and a detector device having a first detection chamber opening out to the extension chamber of the servo-control.

Furthermore, if the servo-control has two bodies, each defining a respective inside space, together with a slider element provided with one control piston per inside space, and at least one of the bodies includes at least one limit force detector device.

Furthermore, the detector device may include at least one return means for acting on the movable member to move said movable member away from said limit position. The return means then tend to position the movable member in a stable position corresponding to a servo-control in which the inside space is not pressurized by a source dedicated for this purpose.

For example, the control means then comprise a spring secured to the movable member.

In another variant, which may be combined with the use of return means, the movable member includes distinct first and second sections, the second section of the movable member facing the second detection chamber being smaller than the first section of the movable member facing the first detection chamber, for example.

Finally, the servo-control optionally includes blocker means for temporarily blocking the slider element relative to the body. Using such blocker means, the detector device serves to test the operation of the servo-control and of the hydraulic directional control valve.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE PREFERRED EMBODIMENTS

Figure 1:
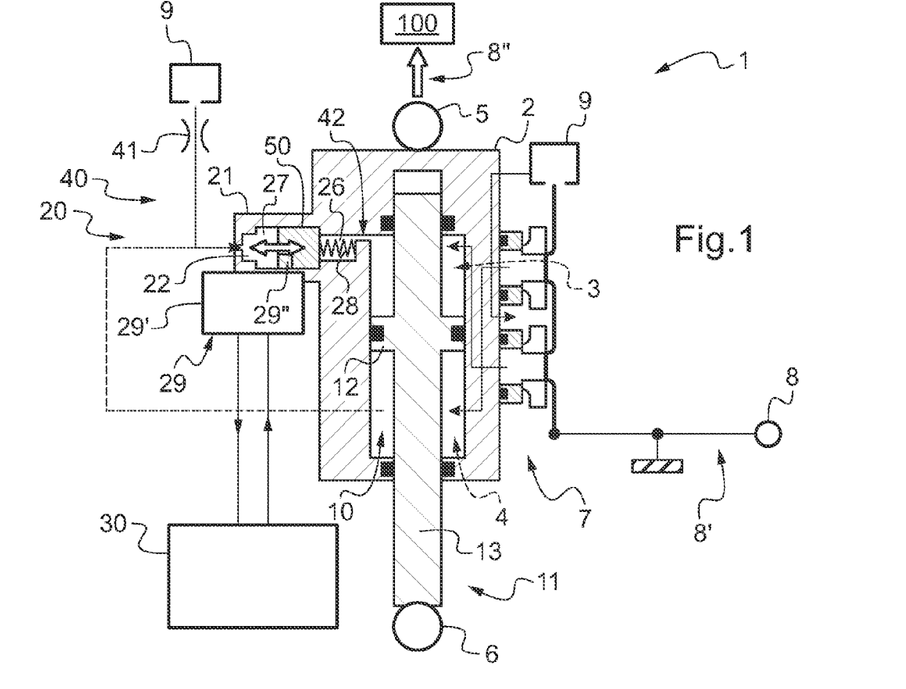
FIGS. 1 and 2 are diagrams showing a single-body servo-control in a first embodiment.

FIG. 1 shows a first embodiment of a servo-control 1.

Independently of the embodiment, the servo-control 1 comprises at least one body 2 defining an inside space 10.

Furthermore, the servo-control includes a slider element 11 provided with a rod 13 and one control piston 12 per body 2. Each control piston 12 subdivides the corresponding inside space 10 into an extension chamber 3 and a retraction chamber 4.

With reference to FIG. 1, the servo-control may be a single-body servo-control, i.e. having a single body and thus a slider element 11 that is provided with a single control piston 12. As described below, the servo-control may be a two-body servo-control, possessing two bodies with a slider element that is provided with two control pistons.

The servo-control shown also possesses a hydraulic directional control valve 7 for conveying a hydraulic fluid from a source 9 to the extension chamber or the retraction chamber 4. The hydraulic control valve 7 is advantageously fastened to the servo-control 1, but it could be separate from the servo-control 1.

In an aviation application, the servo-control is optionally arranged in a linkage connecting a flight control 8 to a control member 100. Under such circumstances, an upstream portion 8' of the linkage connects the flight control 8 to the hydraulic control valve 7, while a downstream portion 8' of the linkage connects first fastener means 5 of the servo-control 1 to the control member 100.

Second fastener means 6 serve to fasten the servo-control 1 to a stationary point. It should be observed that the first fastener means 5 are secured to the body 2, the second fastener means 6 being secured to the projecting end of the rod 13 of the slider element 11. Nevertheless, it is naturally possible to envisage the opposite configuration so as to obtain a servo-control with a stationary body.

The fluid source 9 is then constituted, for example, by the hydraulic circuit of the aircraft, this source delivering a constant pressure to the hydraulic control valve 7.

The flight control 8 controls the hydraulic control valve 7, which feeds the extension chamber 3 to extend the servo-control, or the retraction chamber 4 to retract the servo-control, as appropriate.

The servo-control 1 has at least one detector device 20 for detecting a limit force in order to determine whether the servo-control 1 is being subjected to a force that is greater than or equal to a predetermined limit force.

Figure 9:
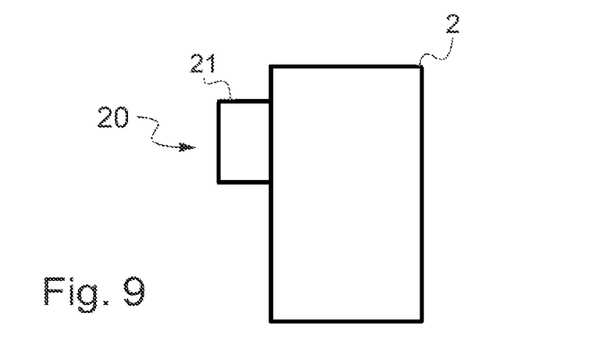
FIG. 9 is a diagram showing a servo-control with a removable detector device.

The detector device 20 comprises a casing 21 secured to the body 2. The casing 21 may be releasably fastened to the body 2 if the detector device is removable as shown in FIG. 9, or it may be permanently fastened thereto.

The casing 21 then defines a hollow detection space 22 opening into the inside space 10 of the body 2.

A detector device 20 also includes a movable member 50 suitable for sliding in the detection space 22.

This movable member 50 then subdivides the detection space into a first detection chamber 26 opening out to the hollow inside space 10, and a second detection chamber 27 filled with a fluid.

For example, the second detection chamber 27 is fed with fluid via a link 40 leading to the source 9. This link 40 may include first headloss-generating means 41, i.e. a diaphragm, for example. The second detection chamber 27 is then filled with a fluid that is maintained at a given pressure.

It should be observed that in the variant shown by a dashed line link in FIG. 1, the second detection chamber 27 may be connected to the chamber in the inside space 10 that is not connected to the first detection chamber 26. For example, the first detection chamber 26 may communicate with the extension chamber 3, while the second detection chamber communicates with the retraction chamber 4. Flowrate-limiter means generating a head loss may be placed in the link going from the second detection chamber 27 to the inside space 10.

Similarly, second headloss-generator means 42 may be arranged between the first detection chamber 26 and the inside space 10.

In order to detect a limit force, the detector device includes detector means 29 for detecting the position of the movable member 50 in the detection space 22. From a given position of the movable member 50, the detector means 29 orders warning means 30 to indicate that the servo-control is being subjected to a force that is greater than or equal to said limit force for the linkage. The warning means 30 trigger a visible or audible warning whenever they receive a given signal coming from the detector means 29.

For example, the detector means may comprise a switch that is open while the servo-control is being subjected to a force that is less than a limit force. Under such circumstances, the warning means are not powered electrically and therefore do not trigger a warning. Conversely, when the servo-control is subjected to a force greater than or equal to the limit force, the switch closes and electrically powers the warning means that switch on a light-emitting diode (LED) for example.

In another version, the switch is closed while the servo-control is being subjected to a force less than a limit force, and open while the servo-control is being subjected to a force greater than or equal to the limit force.

With reference to FIG. 1, while the servo-control is being subjected to a force less than the given threshold, the pressure of the fluid present in the first detection chamber 26, and thus in the chamber of the body that is in communication with said first detection chamber 26, is not sufficient to push the movable member into said given limit position.

Figure 2:
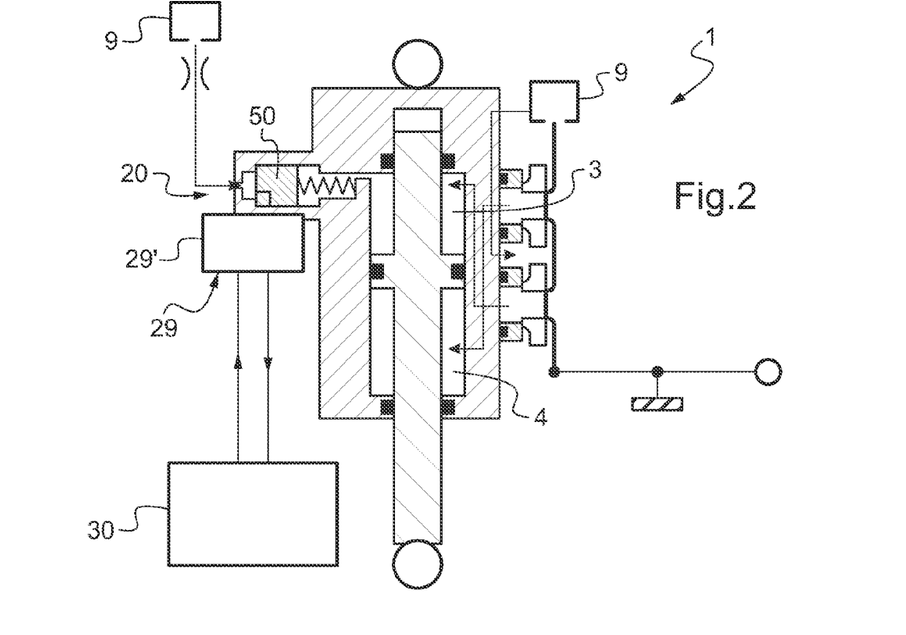

In contrast, with reference to FIG. 2, when the force to which the servo-control 1 is subjected increases, then the pressure of the fluid present in the first detection chamber 26 and in the chamber of the body that is connected to said first detection chamber 26 increases. The moving member then moves in translation and reaches said given limit position. The detector means 29 consequently informs the warning means 30.

The invention does not require a detector device to be secured to one of the means 5 and 6 fastening the servo-control to an external fastener element. On the contrary, the fastener means 5 and 6 of the servo-control 1 are distinct from the limit force detector device 20.

In order to detect the position of the movable member 50, the detector means may include a position sensor arranged on the casing 21, outside the detection space 22.

For example, the position sensor may be a reed switch 29' co-operating with a magnet 29" of the movable member 50.

A reed switch is a switch having two secondary blades and a deflectable main blade. When the main blade is in contact with the first secondary blade, the reed switch does not trigger a warning. Conversely, when the movable member reaches a given position, the magnet on the movable member causes the main blade to deflect towards the second secondary blade, and the detector means 29 then trigger a warning.

In the first embodiment shown in FIGS. 1 and 2, the servo-control 1 is provided with a detector device to determine whether the servo-control 1 is being subjected to compression greater than or equal to a given threshold.

The second detection chamber 26 of the detector device 20 is then open to the extension chamber 3.

It should also be observed that in the variant of the first embodiment that is shown, the detector device 20 includes return means 28 acting on the movable member.

For example, the return means may be a spring, the movable member being a detector piston, a diaphragm, or any other equivalent means, for example.

Figure 3:
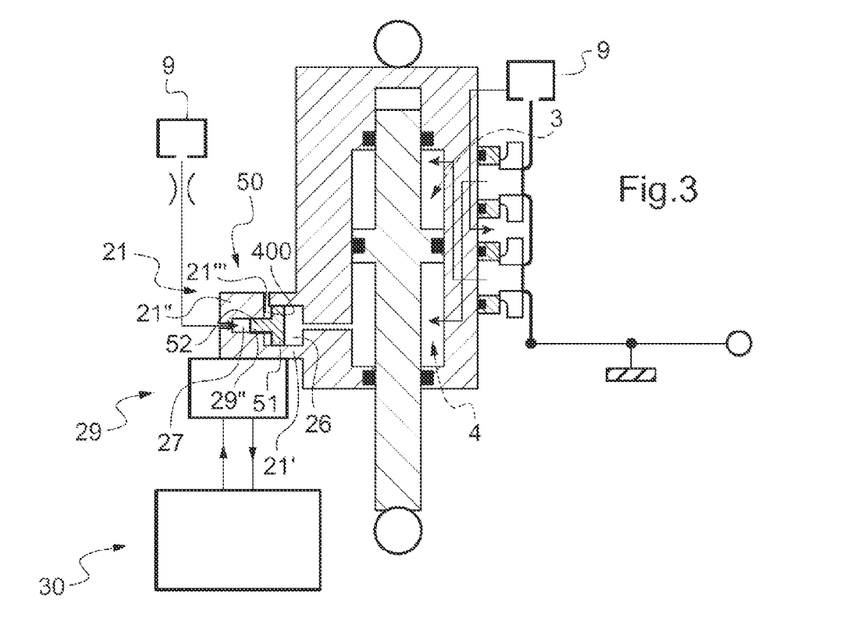
FIG. 3 is a diagram showing a single-body servo-control in a second embodiment.

In the second embodiment shown in FIG. 3, the servo-control 1 is provided with a detector device for determining whether the servo-control 1 is being subjected to a traction force that is greater than or equal to a given limit force.

The second detection chamber 26 of the detector device 20 is then open to the retraction chamber 4.

It should also be observed that in the variant shown of the second embodiment, the detector device 20 comprises a movable member 50 provided with different sectional areas, instead of using return means 28 or in addition to such return means 28.

Consequently, the movable member 50 has first and second different sections 51 and 52 that co-operate with a casing 21 having different sections, being provided with a large section zone 21' in which the first section 51 slides and a small section zone 21" in which the second section 52 of the movable member 50 slides.

For example, the second section 52 of the movable member 50 facing the second detection chamber 27 is smaller than the first section 51 of the movable member 50 facing the first detection chamber 26. Depending on requirements, the opposite configuration is also possible, depending on the pressure difference between the pressure that exists in the second detection chamber and the pressure that exists in the first detection chamber.

Furthermore, the space 400 extending between the large section zone 21' of the casing 20 and the small section 52 of the movable member 50 is provided with an orifice 21'''. This orifice 21''' is then connected to hydraulic storage means of the tank type via a link that is not shown. Thus, if a fluid passes from the first detection chamber to said space 400, in spite of the presence of a gasket, for example, that fluid will be directed towards a dedicated location without giving rise to drawbacks.

It should be observed that in a variant, it is possible to connect the source 9 to this orifice 21''' via a connection that includes flowrate-limiter means, e.g. of the diaphragm type. The second detection chamber 27 may then optionally be connected to the chamber of the inside space 10 that is not in communication with the first detection chamber 26.

Similarly, the connection between the inside space 10 and the first detection chamber 26 may include such limiter means.

Furthermore, it should be observed that it is possible to associate a movable member having different sectional areas with return means, the return means then making it possible in particular to perform tests on operation.

Figure 4:
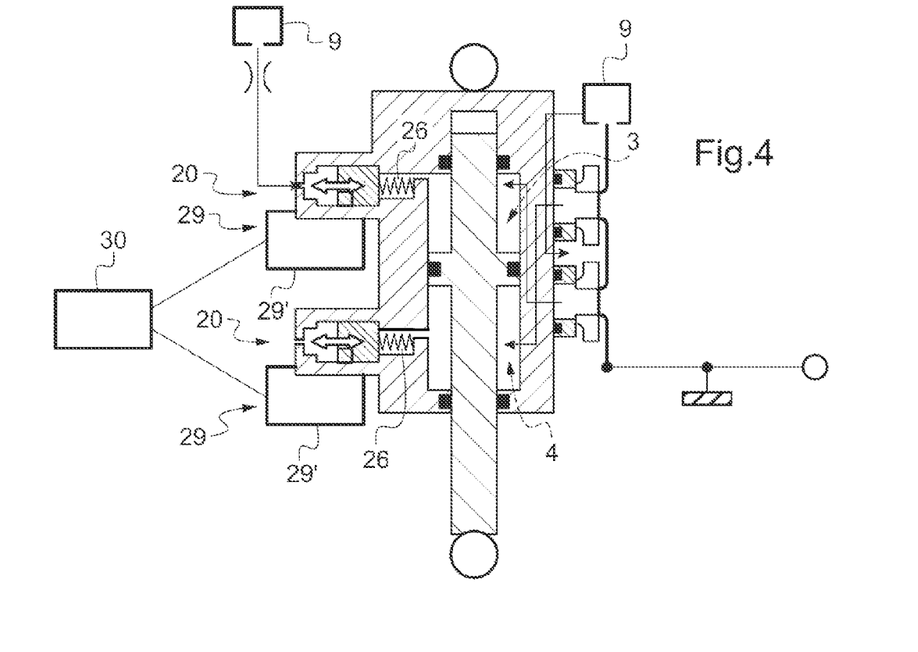
FIG. 4 is a diagram showing a single-body servo-control in a third embodiment.

In the third embodiment shown in FIG. 4, the servo-control 1 has a first detector device to detect whether the servo-control 1 is being subjected to a compression force greater than or equal to a given limit force, and a second detector device determining whether the servo-control 1 is being subjected to a traction force greater than or equal to a given limit force.

The second detection chamber 26 of the first detector device 20 opens out into the extension chamber 3, while the second detection chamber 26 of the second detector device 20 opens out to the retraction chamber 4.

The detector means 29 of the first detector device and of the second detector device may for example be connected to single warning means 30.

Figure 5:
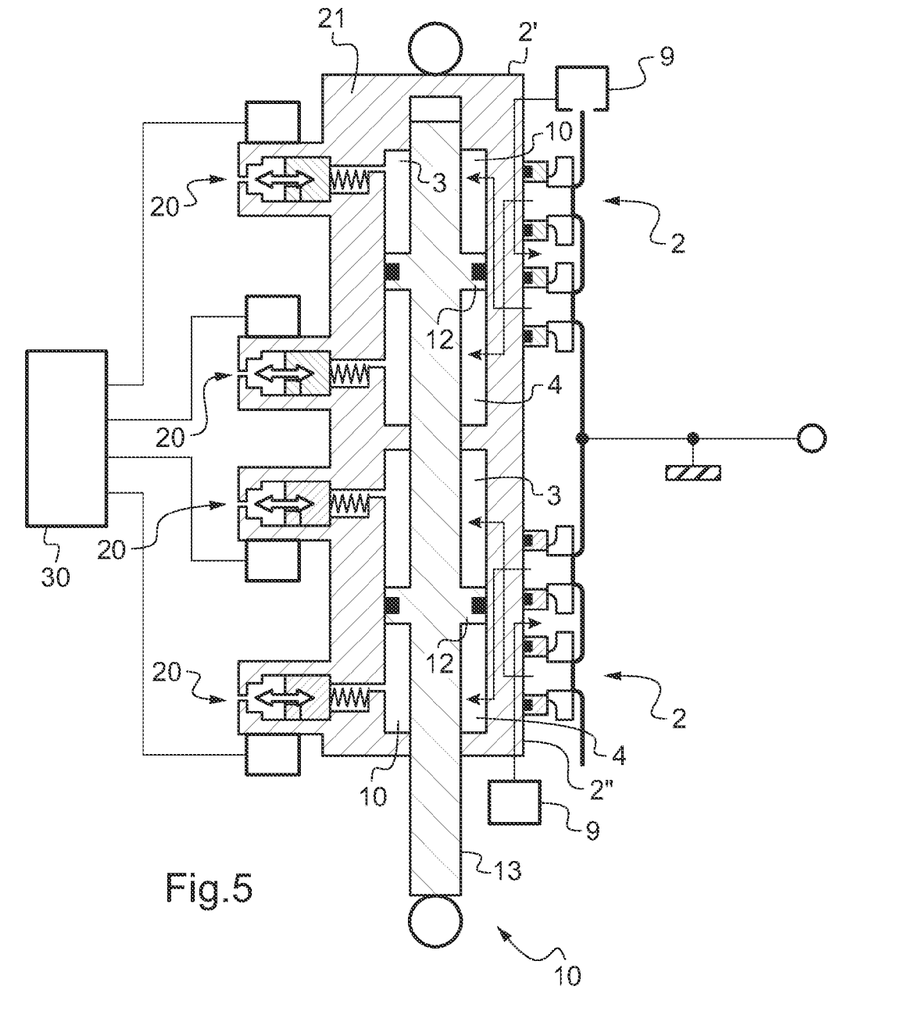
FIG. 5 is a diagram showing a two-body servo-control in a third embodiment.

With reference to FIG. 5, the invention is also applicable to a servo-control 1 having two bodies 2, an upper body 2' and a lower body 2".

The servo-control then has at least one detector device 20, although the version shown diagrammatically is shown with four detector devices.

It is of interest to observe that the invention makes it possible to determine whether the two bodies of the servo-control are synchronized.

In a stable position, both retraction chambers and both extension chambers are subjected to identical pressures. Conversely, if the two bodies are not synchronized, then the pressure will drop in one chamber of each body and rise in the other chamber of each body.

As a result, the two detector devices connected to the chambers having pressure that is increased relative to a theoretical pressure level may trigger a warning.

Figure 6:
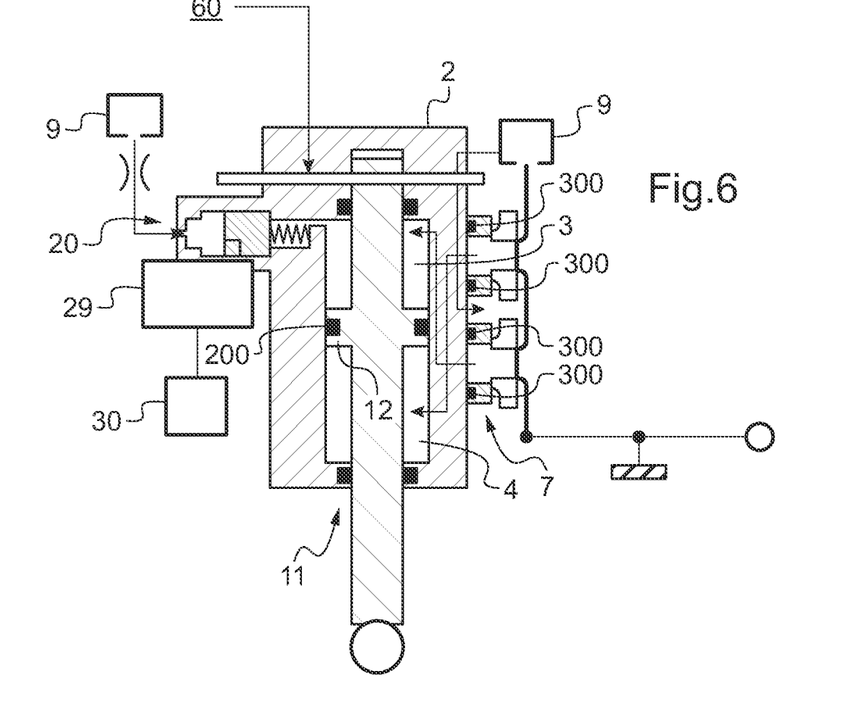
FIGS. 6 to 8 are diagrams showing a servo-control fitted with blocker means.

With reference to FIG. 6, the servo-control may include blocker means 60 for temporarily blocking the slider element 11 relative to a body 2.

Using such blocker means 60, the detector device 20 serves to determine whether the gasket 200 of the control piston 12 of the slider element or the gaskets 300 of the hydraulic control valve 7 are suffering from leakage.

At rest, i.e. when the servo-control is not fed with fluid by the hydraulic control valve 7, an operator prevents the slider element 11 from moving by making use of the blocker means 60, e.g. a pin passing through the body 2 and the rod of the slider element.

Figure 7:
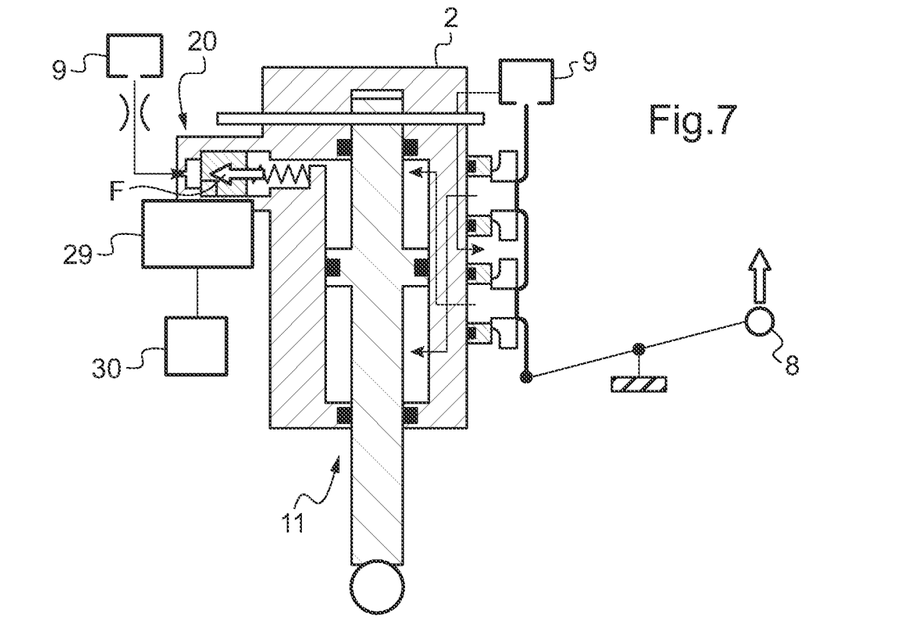

As shown in FIG. 7, the operator operates the flight control so as to feed the chamber of the inside space 10 in communication with the first detection chamber 26, specifically the extension chamber 3 in the example shown. In the absence of leakage, the pressure increases in said chamber and causes the movable member 50 to move in the direction of arrow F. This movement then triggers the warning means 30.

Figure 8:
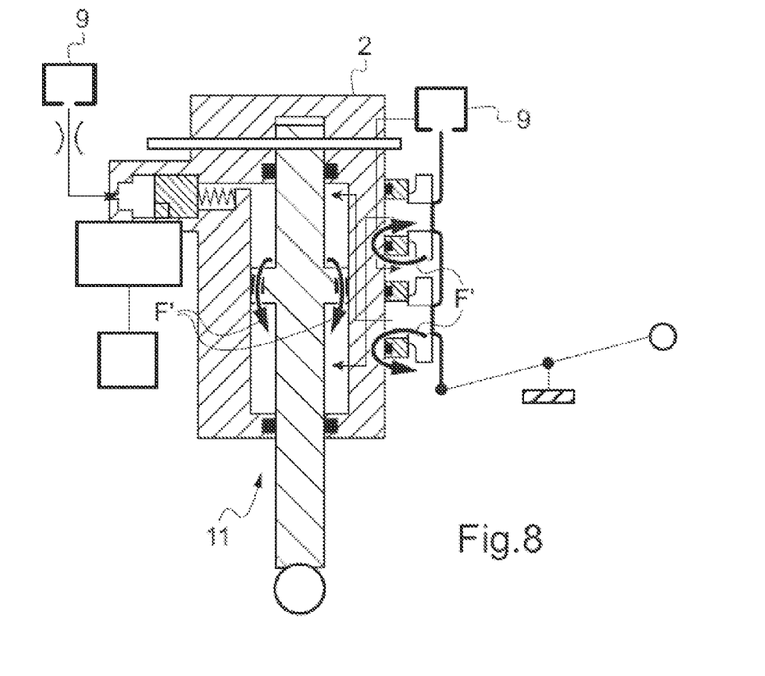

Conversely, with reference to FIG. 8, if leakage is present as represented by arrows F', the pressure does not increase or does not increase sufficiently in said chamber. Consequently, if the warning means do not become active, then the operator can deduce that some of the gaskets in the servo-control are faulty.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. A servo-control having at least one body defining an inside space and a slider element having a control piston suitable for sliding in the inside space, the control piston subdividing the inside space into a retraction chamber and an extension chamber suitable for being fed with a fluid delivered by a source, the servo-control having at least one limit force detector device for detecting a limit force exerted on the servo control, wherein the limit force detector device comprises:
    a casing secured to the body and defining a detection space;
    a movable member slidable in the detection space, the movable member subdividing the detection space into a first detection chamber opening out to the inside space and a second detection chamber connected to a pressurization means via a first head loss generator means; and
    detector means for detecting the position of the movable member in the detection space in order to determine whether the movable member has reached a predetermined limit position corresponding to the presence of a limit force being exerted on the servo-control, the detector means including a warning means controlled by the detector means;
    wherein the at least one limit force detector device is a first detector device having the first detection chamber opening out to the retraction chamber of the servo-control, and a second detector device having the first detection chamber opening out to the extension chamber of the servo-control.

2. A servo-control according to claim 1, wherein the detector device is removable.

3. A servo-control according to claim 1, wherein the body includes fastener means distinct from the detector device and suitable for fastening the servo-control to an external fastener element.

4. A servo-control according to claim 1, wherein the pressurization means includes the source.

5. A servo-control according to claim 1, wherein a second headloss-generator means is arranged between the first detection chamber and the inside space.

6. A servo-control according to claim 1, wherein the detector means are arranged on the casing outside the detection space.

7. A servo-control according to claim 1, wherein the detector means comprise a reed switch and a magnet placed on the movable member.

8. A servo-control according to claim 1, wherein the servo-control has two bodies, each defining a respective inside space, together with a slider element provided with one control piston per inside space, and at least one of the bodies includes at least one limit force detector device.

9. A servo-control according to claim 1, wherein the detector device includes at least one return means for acting on the movable member to move the movable member away from the limit position.

10. A servo-control according to claim 1, wherein the movable member includes distinct first and second sections, the second section of the movable member facing the second detection chamber being smaller than the first section of the movable member facing the first detection chamber, the detection space having a wide portion within which the first section of the movable member moves, a narrow portion within which the second section of the movable member moves, and an orifice in the narrow portion that is not in fluid communication with the inside space.

11. A servo-control according to claim 1, including blocker means for temporarily blocking the slider element relative to the body.

12. The servo-control of claim 1, wherein the movable member is movable between a neutral position and the predetermined limit position, the neutral position corresponding to a force exerted on the servo control being within an allowable range and the limit force being at a limit of the allowable range beyond which an aircraft structure may be damaged.

13. The servo-control of claim 1, wherein the movable member fluidly separates the first detection and the second detection chamber.

14. A servo-control comprising:
a cylinder defining a first cavity;
a piston slidably retained within the cylinder, subdividing the first cavity into an extension chamber and a retraction chamber;
a rod drivably connected to the piston;
a removable pin selectively holding the piston against sliding relative to the cylinder;
a hydraulic source in fluid communication with the first cavity; and
at least one limit force detector, each of the at least one limit force detectors including:
a casing defining a second cavity;
a movable member including a magnet and subdividing the second cavity into a first detection chamber and a second detection chamber, the first detection chamber being in fluid communication with the first cavity and the second detection chamber being in fluid communication with the hydraulic source, the movable member being movable between a neutral position and a predetermined limit position in response to a force exerted on the servo control, the neutral position corresponding to the force exerted being within an allowable tolerance range;
a reed switch cooperable with the magnet to close a circuit in response to the movable member being at the predetermined limit position; and
a warning device configured to generate a warning in response to the reed switch closing the circuit
wherein the at least one limit force detector is two limit force detectors, the first detection chamber of a first limit force detector being in fluid communication with the extension chamber and the first detection chamber of a second limit force detector being in fluid communication with the retraction chamber.

15. The servo-control of claim 14, wherein the movable member fluidly separates the first detection and the second detection chamber.

16. A servo control comprising:
a body defining a first cavity;
a slider element having a control piston slidably retained within the first cavity, the control piston subdividing the first cavity into a retraction chamber and an extension chamber;
a hydraulic source in fluid communication with the first cavity; and
at least one limit force detector, each of the at least one limit force detectors including:
a casing removably secured to the body and defining a second cavity;
a movable member slidably retained within the second cavity and fluidly separating the second cavity into a first detection chamber and a second detection chamber, the second detection chamber being in fluid communication with the hydraulic source via a first head loss generator and the first detection chamber being in fluid communication with the first cavity via a second head loss generator, the movable member being entirely retained within the second cavity and movable between a neutral position and a predetermined limit position, the neutral position corresponding to a force exerted on the servo control being within an allowable range and the predetermined limit position corresponding to a force exerted on the servo control being at a limit of the allowable range;
a position sensor configured to detect a position of the movable member at a predetermined limit position; and
a warning device configured to generate a warning in response to the movable member being detected at the predetermined limit position
wherein the at least one limit force detector is two limit force detectors, the first detection chamber of a first limit force detector being in fluid communication with the extension chamber and the first detection chamber of a second limit force detector being in fluid communication with the retraction chamber.

* * * * *